US007002975B2

(12) United States Patent
Galicki et al.

(10) Patent No.: US 7,002,975 B2
(45) Date of Patent: Feb. 21, 2006

(54) MULTIPROCESSOR NETWORK NODE FAILURE DETECTION AND RECOVERY

(75) Inventors: Peter Galicki, Sugarland, TX (US); Richard Oed, Erding (DE)

(73) Assignee: Texas Instruments Incorporated, Dallas, TX (US)

( * ) Notice: Subject to any disclaimer, the term of this patent is extended or adjusted under 35 U.S.C. 154(b) by 851 days.

(21) Appl. No.: 09/904,991

(22) Filed: Jul. 13, 2001

(65) Prior Publication Data

US 2002/0018480 A1 Feb. 14, 2002

Related U.S. Application Data

(60) Provisional application No. 60/224,586, filed on Aug. 11, 2000.

(51) Int. Cl.
*H04L 12/28* (2006.01)

(52) U.S. Cl. .................................. 370/401; 370/216
(58) Field of Classification Search ............... 370/216, 370/217, 218, 221, 242, 244, 250, 254, 351, 370/400, 389, 401, 394, 474; 714/100, 1, 714/2, 748, 749
See application file for complete search history.

(56) References Cited

U.S. PATENT DOCUMENTS

| | | | | |
|---|---|---|---|---|
| 4,679,186 A | * | 7/1987 | Lea ............................. | 370/218 |
| 5,051,987 A | * | 9/1991 | Conlon ......................... | 370/255 |
| 5,065,308 A | * | 11/1991 | Evans ........................... | 714/11 |
| 5,583,990 A | * | 12/1996 | Birrittella et al. .............. | 712/29 |
| 5,732,086 A | * | 3/1998 | Liang et al. .................. | 370/410 |
| 5,892,923 A | * | 4/1999 | Yasuda et al. ............... | 709/239 |
| 6,058,120 A | * | 5/2000 | Sabzevari .................... | 370/466 |
| 6,292,463 B1 | * | 9/2001 | Burns et al. ................. | 370/216 |
| 6,549,954 B1 | * | 4/2003 | Lambrecht et al. ......... | 719/315 |
| 6,681,316 B1 | * | 1/2004 | Clermidy et al. ............. | 712/11 |
| 6,760,302 B1 | * | 7/2004 | Ellinas et al. ................ | 370/228 |
| 6,785,277 B1 | * | 8/2004 | Sundling et al. ............ | 370/392 |

* cited by examiner

*Primary Examiner*—Ajit Patel
*Assistant Examiner*—Andrew C. Lee
(74) *Attorney, Agent, or Firm*—Robert D. Marshall, Jr.; W. James Brady, III; Frederick J. Telecky, Jr.

(57) ABSTRACT

In a node failure detection technique at least one supervisory data processing node periodically transmits a receipt acknowledge data packet to each other data processing node. The supervisory data processing node determines a data processing node has failed upon failure to receive a return acknowledge data packet. This acknowledge data packet preferably includes health data concerning its current health operating status. The supervisory data processing node sends a reset data packet to any failed data processing node determined. If the reset does not return the data processing node to normal operation, then routing data at neighboring data processing nodes is altered to route data packets around the failed node.

8 Claims, 10 Drawing Sheets

THE PACKET ENTERING THE BRIDGE THROUGH THE RIGHT PORT IS HEADED BY A NONEXISTING DESTINATION ADDRESS

DATAPIPE EATS BOGUS PACKETS IN ORDER TO PREVENT BLOCKING OF LEGITIMATE PACKETS

MULTIPROCESSOR NETWORK NODE FAILURE DETECTION AND RECOVERY

CROSS REFERENCE TO RELATED APPLICATIONS

This application is related to the following copending application:

This application claims priority under 35 USC §119(e)(1) of Provisional Application No. 60/224,586, filed Aug. 11, 2000.

U.S. Provisional Application No. 60/224,607 entitled DATAPIPE ROUTING BRIDGE now U.S. patent application Ser. No. 09/905,378; and U.S.Provisional Application No. 60/224,913 entitled PULL TRANSFERS AND TRANSFER RECEIPT CONFIRMATION IN A DATAPIPE ROUTING BRIDGE now U.S. patent application Ser. No. 09/905,379.

TECHNICAL FIELD OF THE INVENTION

The technical field of this invention is data communication among a plurality of data processors.

BACKGROUND OF THE INVENTION

All current methods of inter-digital signal processor traffic management have a negative impact on the loading of the central processor unit (CPU) and the direct memory access (DMA) function. In addition there is a negative impact on the number of external pins/components and the complexity of operation. Conventional methods also have confining limits on the number of processors that can be connected together and the manner in which they may be connected together. The data streams used in current methods do not have means to carry control elements for transfer path reconfiguration ahead of the data packets, or for propagating a not ready signal up the stream to prevent data overruns. These limitations force the CPU/DMA and other chip resources to be actively involved in data traffic management at the cost of fewer cycles available to processing of data. The current methods also do not allow multiple digital signal processors to collectively receive the same data stream.

SUMMARY OF THE INVENTION

The datapipe routing bridge is the next generation interprocessor communications peripheral. It is composed of three building blocks, transmitter, bridge and receiver. The main function of the bridge component is to provide high levels of connectivity between multiple digital signal processors without paying the penalties usually associated with inter-processor connections. The individual digital signal processors are connected with unidirectional point-to-point links from a bridge terminal on one digital signal processor to a bridge terminal on another digital signal processor. Depending on the real-time comparison of the packet header information with direction identification codes (IDs) stored inside the bridge, individual data transfer packets arriving at the bridge of each digital signal processor along the way are autonomously absorbed into the local processor, repeated out to the next processor or simultaneously absorbed and repeated.

This invention is a node failure detection technique. At least one supervisory data processing node periodically transmits a receipt acknowledge data packet to each other data processing node. The data processing nodes normally respond to such a receipt confirmation data packet by transmitting an acknowledge data packet to the source data processing node. The supervisory data processing node determines a data processing node has failed upon failure to receive the acknowledge data packet. Each data processing preferably stores health data concerning its current health operating status. The receipt confirmation data packet includes the health data.

The supervisory data processing node sends a reset data packet to any failed data processing node determined. Each data processing node normally resets its internal data processor upon receipt of a reset data packet. If the reset does not return the data processing node to normal operation, then routing data at neighboring data processing nodes is altered to route data packets around the failed node.

Each data processing node stores routing data corresponding to each node ID. A received data packet is routed depending of node ID data in a header. A data packet with a destination node ID not found in the stored routing data is absorbed and not retransmitted. Each data processing node has a timer periodically reset by its internal CPU core. Expiration of the timer indicates a failed CPU core. The bridge part of the data processing node absorbs any received data packets upon such a time out.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
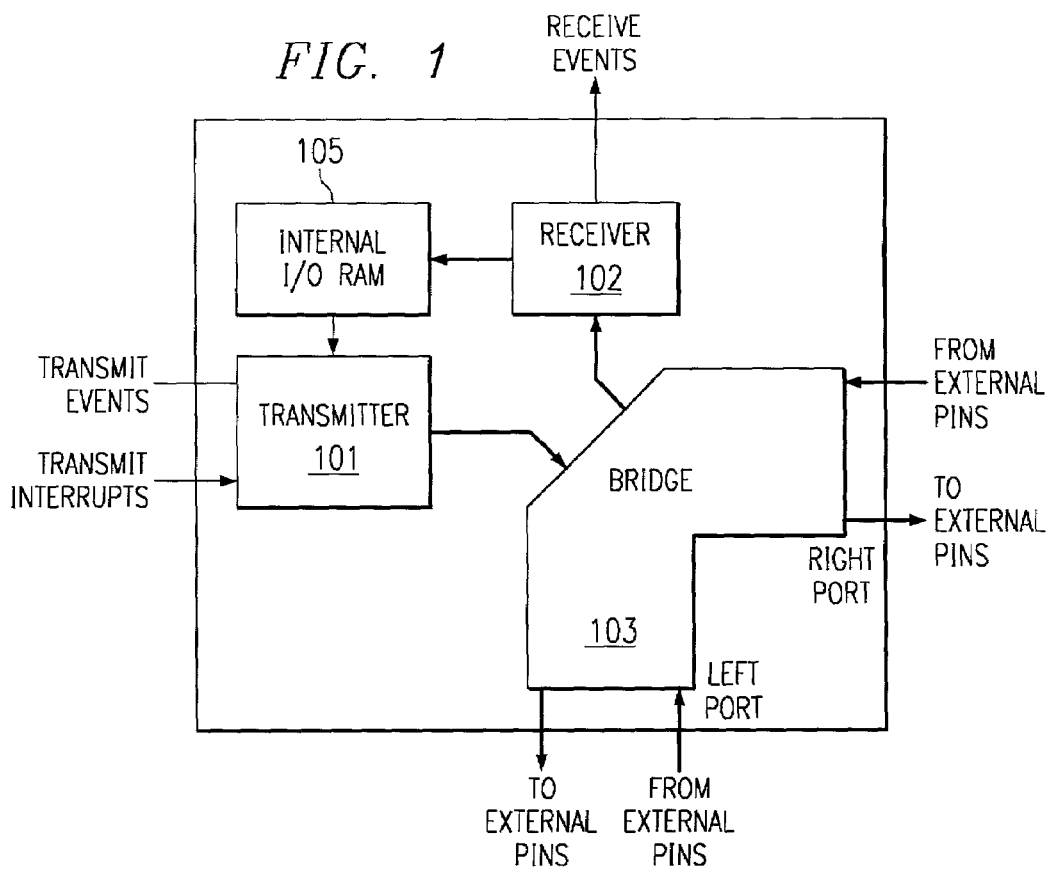
FIG. 1 illustrates the block diagram of a datapipe routing bridge peripheral.

This application uses the descriptive name datapipe routing bridge or simply datapipe to describe a packet based communications peripheral connecting multiple processors without glue logic or CPU intervention. FIG. 1 illustrates the makeup of a datapipe. It is composed of three building blocks transmitter 101, bridge 103 and receiver 102. The main function of the bridge component is to provide high levels of connectivity between multiple digital signal processors without paying the penalties usually associated with inter-processor connections. Dedicated routing logic within the datapipe autonomously navigates data packets of programmable size along the shortest distance from the source processor to one or more destination processors. Transmitter 101 may transmit data packets via bridge 103 to one or both of the right and left ports. Transmitter 101 responds to transmit events and transmit interrupts from an associated data processor (not shown) to supply data from internal I/O memory 105 to bridge 103. Bridge 103 is capable of retransmitting a data packet received at one of the right or left ports to the other port. Bridge 103 may also transfer a received data packet to receiver 102 in addition to or instead of retransmission at the other port. The actions of bridge 103 are determined by a header of the data packet. Upon receipt of a data packet, receiver stores the received data in internal I/O memory 105 and may generate a receive event to the associated data processor. In the preferred embodiment the associated data processor is a digital signal processor.

Figure 2:
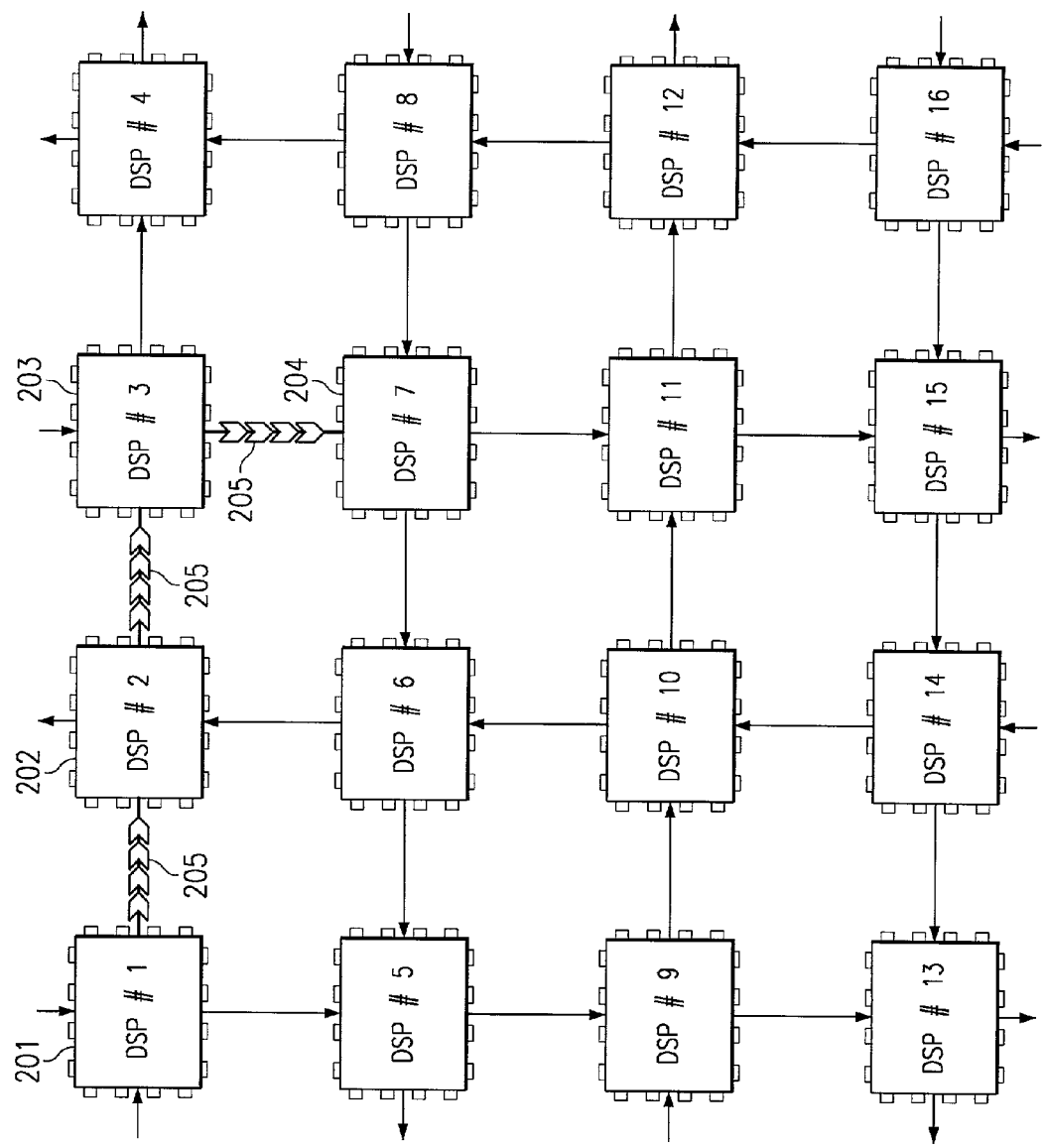
FIG. 2 illustrates an array of multiple processors connected in a datapipe network.

FIG. 2 illustrates an array of multiple digital signal processors connected in a datapipe network. Each intermediate processor 202 and 203, between source processor 201 and destination processor 204 repeats the packet to the next processor through dedicated point-to-point uni-directional links 205. Each link contains a 16-bit data bus, its own transfer clock and a ready signal. The links 205 also contain a 2-bit control signal identifying the data content (at the rising edge of the transfer clock) as a packet body or a control opcode used by the datapipe routing logic to navigate the packet to its destination.

As illustrated in FIG. 2, the 2-dimensional communications grid implemented with the datapipe has a single input or output link (not both) on each of the 4 edges of each digital signal processor node. Other solutions that do not have the programmable packet routing capability of the datapipe may require and "in" and "out" channels on each edge to function in a two dimensional grid arrangement. Single direction per edge (one way street) is possible because of the following two datapipe features:

1. Every datapipe bridge in the system is aware of the exact relative location of every other datapipe node in that system.

2. The ability of each bridge to use feature 1 to make multiple turns to approach the destination from only two edges instead of 4 edges in case of a 2-way street.

The feature is a key to datapipe efficiency. The combined routing knowledge of the packet combined with the knowledge of each node where the other nodes are, can force the packet to take the extra turns through the system to approach the destination from only 2 edges instead of 4 edges.

In FIG. 2 those edges are up and left (or down and right, depending on the node) and if the packet were to continue past node seven to node 6 it would autonomously be forced by node 7 to make another right turn to approach node 6 from it's right edge. The datapipe routing is designed to reduce the number of input pins by half by not requiring input channels on the left and up edges of node 6. Conventional methods need inputs on all four edges of each node to implement orthogonal grid communications, because they can not autonomously make multiple turns to approach the destination node from just two edges.

Figure 3:
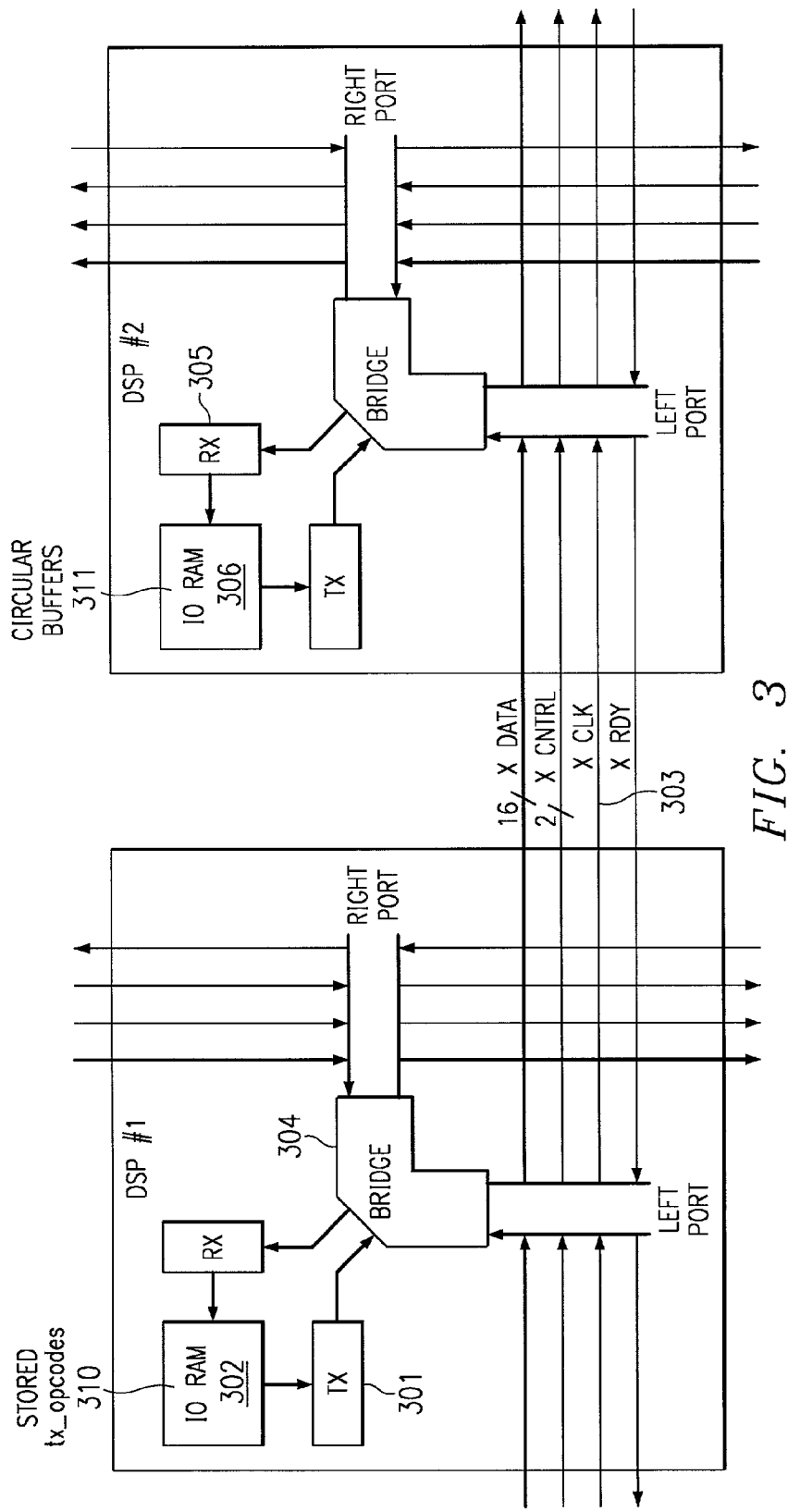
FIG. 3 illustrates a single communications link between two digital signal processors using a datapipe routing bridge peripheral.

FIG. 3 illustrates the three components of the datapipe hardware at each terminal node and their connection to the datapipe network in an example data transfer. The transmit controller 301 drives the packets from internal I/O RAM 302 out lines 303 to the links connecting the digital signal processors. The communications bridge 304 routes each packet into or around each digital signal processor node on the network. For each packet routed into a node from the network, the receive unit 305 pushes the packet into the local I/O RAM 306 of the destination digital signal processor.

Both of the two external ports of the bridge feature two unidirectional channels, one for input and one for output. Both transmitter and receiver can send communications events to the interrupt selectors in the associated digital signal processor. The transmitter can also respond to interrupts from the interrupt selector. The receiver can also send an interrupt directly to the transmitter.

The datapipe uses internal I/O RAM 306 for temporary storage of outgoing data and for buffering of the incoming data. The datapipe transmitter 301 uses the internal I/O RAM 302 to store tx_opcodes 310 instructing it what blocks to transfer and their locations within internal I/O RAM 302. The datapipe receiver deposits incoming packets into dedicated internal I/O RAM 306 circular buffers 311.

Figure 4:
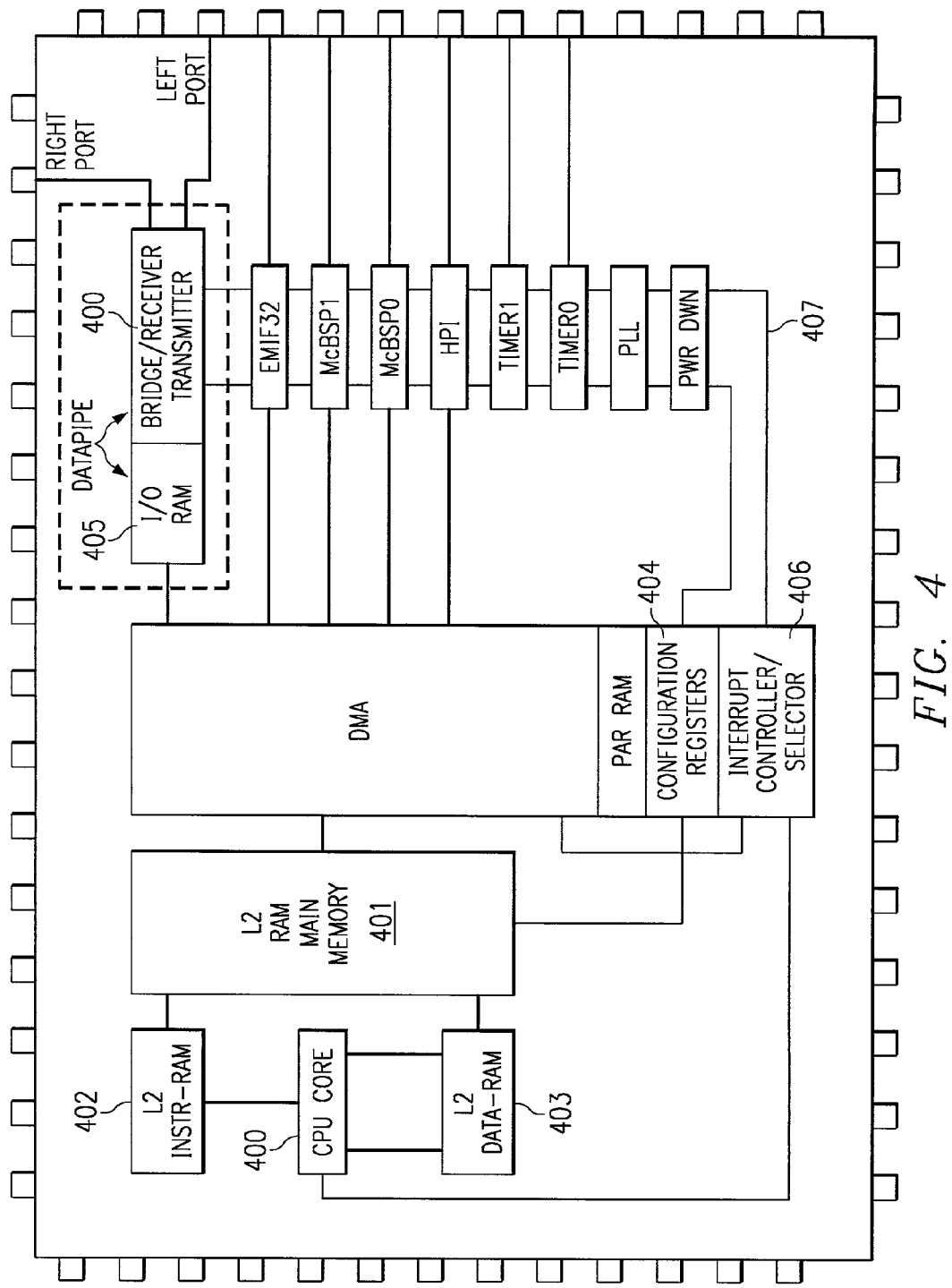
FIG. 4 illustrates the a datapipe routing bridge peripheral within a conventional digital signal processor chip.

FIG. 4 illustrates the datapipe within a conventional digital signal processor integrated circuit. Internal I/O RAM input buffers 405, when almost full, send an event to the chip direct memory access (DMA) unit to move the data into the level 2 (L2) main memory 401, where it can be accessed directly by the central processing unit core 400. Note that this application contemplates that central processing unit core 400 is a digital signal processor, however this invention is equally applicable to a general purpose data processor. Internal I/O RAM 405 of the datapipe is split into two independent blocks for simultaneous direct memory access unit and datapipe access. The direct memory access port servicing internal I/O RAM 405 and the datapipe looks exactly like the other direct memory access ports driving the remaining chip peripherals. FIG. 4 further illustrates conventional features of a digital signal processor including L2 instruction RAM 402, L2 data RAM 403, parameter RAM (PAR RAM), power down circuit (PWR DWN), phase locked loop circuit (PLL), first and second timers (TIMER0, TIMER1), a host port interface (HPI), two multi-channel buffered serial ports (McBSP0 and McBSP1) and a 32-bit external memory interface (EMIF32).

Collecting small amounts of I/O data outside of L2 memory and bringing it into L2 in larger blocks, increases direct memory access efficiency and decreases the probability of central processing unit/direct memory access conflicts inside the L2. The datapipe configuration registers 404 and interrupt registers 406 are memory mapped in the configuration space. The datapipe receiver and transmitter events are carried by a bus 407 to the interrupt registers 406, where some of the same receiver events can be bounced back to the transmitter in the form of datapipe transmit interrupts.

The datapipe interrupt flag/enable registers which are a part of the digital signal processor interrupt selector/controller 406 and the datapipe configuration registers 404 are memory mapped in the configuration bus space. Each digital signal processor with one datapipe peripheral has two receive channels and two transmit channels. One receive channel on processor A connects to one transmit channel of processor B, and conversely the second transmit channel on processor B connects to the second receive channel of processor A.

The datapipe is a general purpose inter-processor communication peripheral supporting most common communication protocols. Because of its fully programmable functionality involving routing method, packet size, and total number of nodes organized in cells, the datapipe can be easily adapted to less common communication approaches and still not require glue logic or CPU intervention. It has a fully scalable architecture, which makes it possible to add or remove processors without any changes in system hardware or software drivers. The following features make the datapipe adaptable to a wide spectrum of digital signal processor applications:

Point-to-point transfers;
Broadcast transfers;
Unlimited node count;
Hardware routing requires no reliance on CPU to transfer data;
Zero-glue logic connections between processing nodes;
Up to 800 Mbytes/s transfer rates;
Programmable transfer control;
Programmable packet size;
Programming interface through tables in memory;
Supports linear, orthogonal mesh and tree topologies;
Receiver sends data receipt confirmation to the sender;
Data log for transmitted data receipts;
Data log for received data;
Scalable architecture; and
Supports both expected and unexpected transfers.

Each digital signal processor with one datapipe peripheral has two receive channels and two transmit channels. The receive channel on one processor connects to the transmit channel of another, and vice-versa as already described in FIG. 3. While the orthogonal grid topology maps well into a typical two-dimensional circuit board, the individual receive and transmit channels can be connected in linear, tree or custom arrangements that best fit the application. Even after the processors on the board have been hard-wired into a specific connection topology, the logical ports can still be reprogrammed in software to a different subset topology without changing the hardware.

Figure 5:
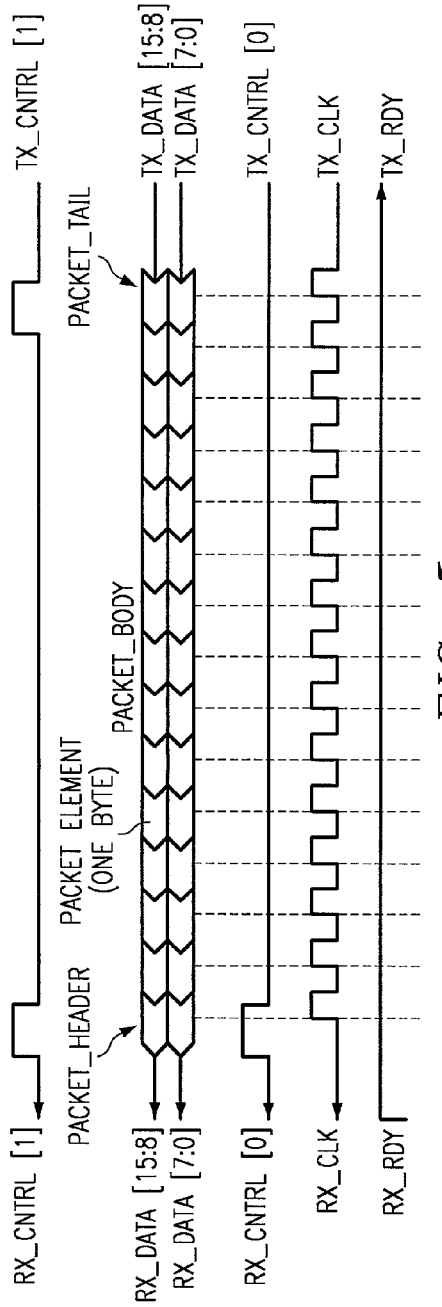
FIG. 5 illustrates the timing diagram of a packet transfer when the destination is always ready to receive.

FIG. 5 illustrates the signals and timing of a data transfer. A typical transfer starts at the source digital signal processor where a packet is injected into the datapipe network through one of transmit channels. The header preceding the packet content contains information about one or multiple destinations for the packet. As it enters each node, the header is processed with the local identification ID registers inside the datapipe bridge. The bridge left and bridge right ID registers have knowledge of the location of all other processors within a 32-processor communications cell. The packet may be accepted into the node, routed back out through the left or right port, whichever is closer to the destination encoded in the header, or both accepted into the node and routed to the port. Broadcast packets can navigate to multiple destinations.

A single unidirectional channel between any two processors contains a 16-bit data bus, two control signals, a transfer clock and a ready signal. The dedicated transfer clocks, operating at half the frequency of the internal datapipe logic, make it possible to connect multiple digital signal processor nodes without any external logic, even if all digital signal processors are clocked by unsynchronized clock sources running at different frequencies.

A 16-bit data bus in each channel represents two byte-wide transfer units. Each transfer byte can represent data or a receive control opcode, as designated by the corresponding control signal. At each rising edge of the transfer clock, a low TX_CNTRL[0] signal designates the TX_DATA[7:0] signals as packet data content, while a high TX_CNTRL[0] signal designates the same TX_DATA[7:0] signals as rx_opcodes. Similarly, the TX_CNTRL[1] signal designates the TX_DATA[15:8] signals as data content or rx_opcodes. The rx_opcodes are typically located in front of the data content (header) or immediately following the data (tail). The rx_opcodes typically contain information that the bridge routing logic needs to navigate the packet to its destination. Other rx_opcodes may be used for bridge and receiver initialization, receive channel selection and to recognize boundaries between consecutive packets. The ready signal, originating at the receive side of each channel, propagates in the direction opposite to the flow of data. A high ready signal indicates that the receiver is ready to absorb any data that may be going its way. A low ready signal, indicating a backed-up receiver, directs the transmitter on the opposite side of the channel to suspend sending data within a certain number of cycles.

Figure 6:
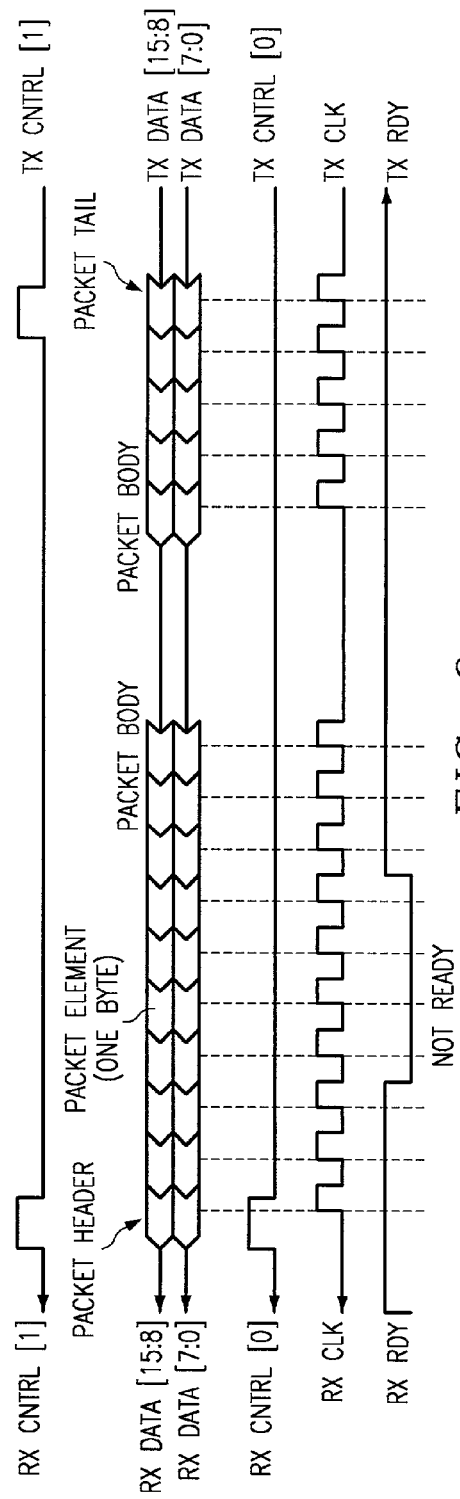
FIG. 6 illustrates the timing diagram of a packet transfer when the destination is not ready to receive.

FIG. 6 illustrates the timing diagram of a packet transfer when the destination is not ready to receive data. A continuous not ready state will cause the not ready signal to propagate up the data stream, gradually halting additional nodes in an orderly fashion and without any loss of data. The transfer clock is active only when there is valid data on the data lines. In case of a low ready signal, or when the transmitter has no data to transfer, the transfer clock is deactivated in a low state to conserve power and to reduce noise.

Figure 7:
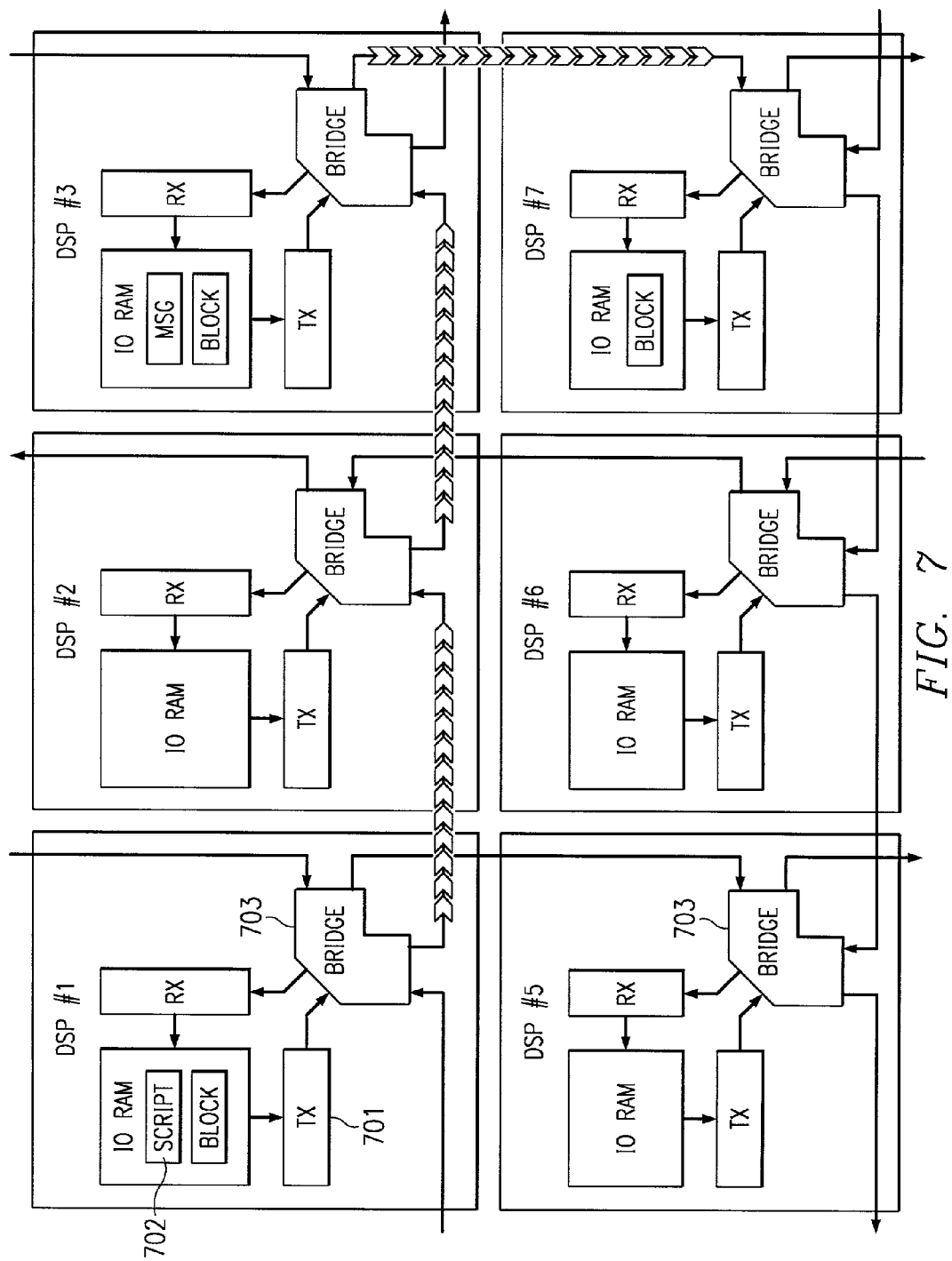
FIG. 7 illustrates packet transfer flow between one source and two destinations.

FIG. 7 illustrates packet transfer flow between one source and two destinations. Each transfer starts by the transmitter 701 fetching a 32-bit tx_opcode from a transmit script 702 inside an I/O RAM and interpreting the encoded transfer similarly to a CPU interpreting an instruction to operate on data. Rather than operating on data, the transmitter script sends data to another digital signal processor across the local bridge 703 and through the datapipe network. There are two ways that a tx_opcode can cause a data packet to be injected into the datapipe network. These are: a MSG tx_opcode contains embedded data; or a BLOCK tx_opcode pulls the data from a location in I/O memory separate from that which holds the tx_opcodes.

The use of the MSG tx_opcode is similar to having an immediate operand embedded inside a processor instruction. The data that the instruction operates on is a part of the instruction-data that the MSG tx_opcode transmits.

The use of the BLOCK tx_opcode is similar to an indirect addressing mode using the same processor analogy. The data that the BLOCK tx_opcode transmits has its address embedded inside the BLOCK tx_opcode, but the data itself is residing in a different area of memory. A BLOCK tx_opcode causes the transmitter to transfer a block of data from a different local I/O RAM location, whose address has been previously loaded into the transmitter address register with other tx_opcodes preceding the BLOCK tx_opcode.

Regardless of how each packet was injected into the datapipe network by the transmitter, the packet header guides it across the network to one or more destination nodes. For example a short point-to-point packet sourced by a MSG tx_opcode could travel across only one intermediate node arriving at one and final destination node. The longer packet with a broadcast header, launched from the same node by the BLOCK tx_opcode, can also make its first delivery after one intermediate node. But instead of stopping there, it could go on to deposit the same block of data for the second time in another node on the datapipe network.

Figure 8:
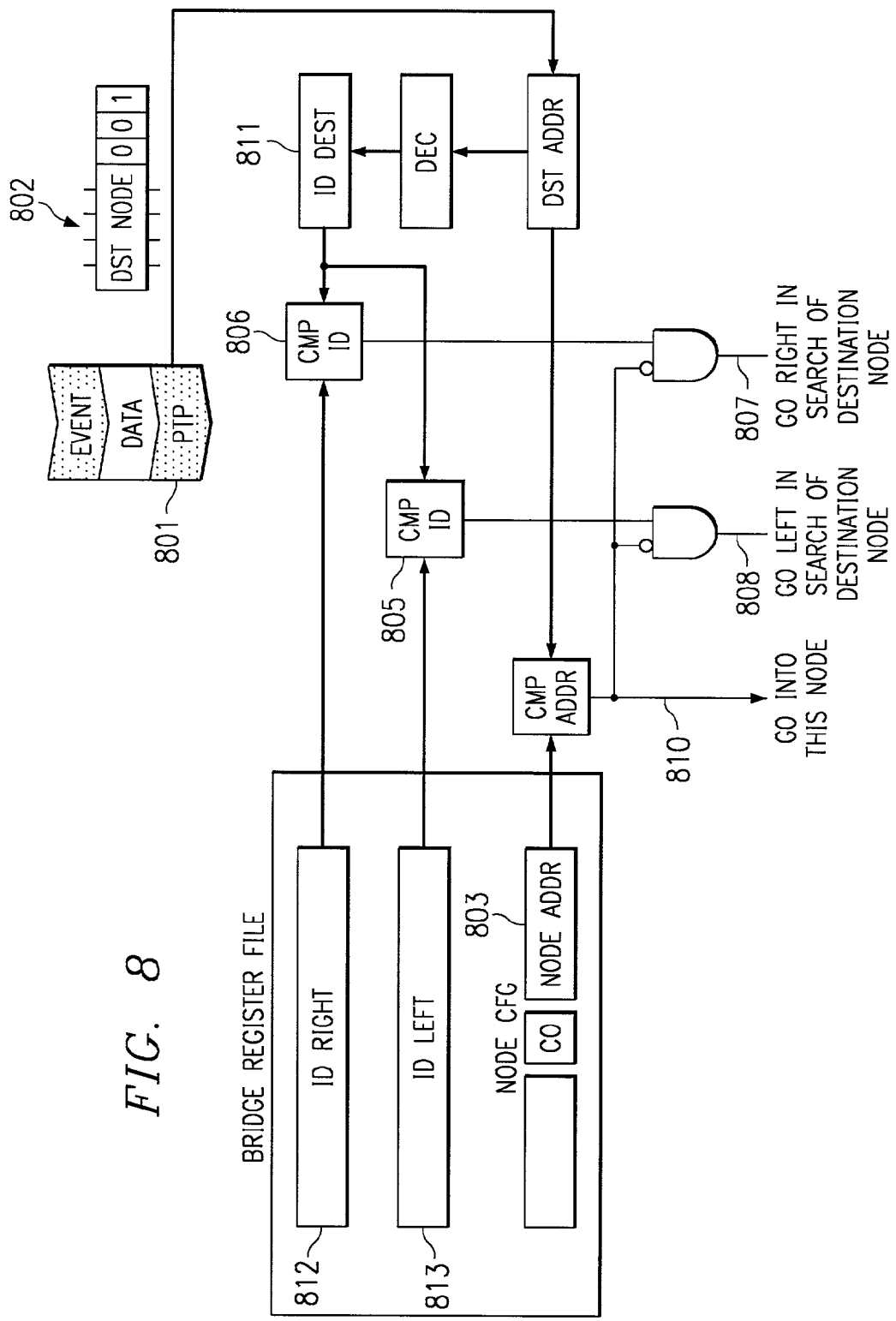
FIG. 8 illustrates point-to-point packet routing protocol.

FIG. 8 illustrates point-to-point packet routing protocol. A point-to-point packet is identified by a PTP rx_opcode 801 in its header. As the header enters the bridge component at a local node, the DST_NODE field 802 inside the PTP rx_opcode 801 is compared the 5-bit NODE_ADDR field of the bridge NODE_CFG Register 803. A successful address match 810 causes the packet to enter this local node through the bridge internal center port, across the receiver and into the active channel block of the local I/O PAM. A negative address match triggers the left port ID comparator 805 and right port ID comparator 806 that compare the decoded value of the DST_NODE field 802 against the two 32-bit resident direction registers, ID_RIGHT 812 and ID_LEFT 813. A successful right match at right port ID comparator 806 causes the packet to be routed out of bridge 103 through the right port 807 to another node in the network. A successful left match at left port ID comparator 805 causes the packet to be routed out of bridge 103 through left port 808 to another node on the network. Left port ID comparator 805 and right port ID comparator 806 form a bitwise AND. A logical 1 in any bit location indicates a successful match.

Figure 9:
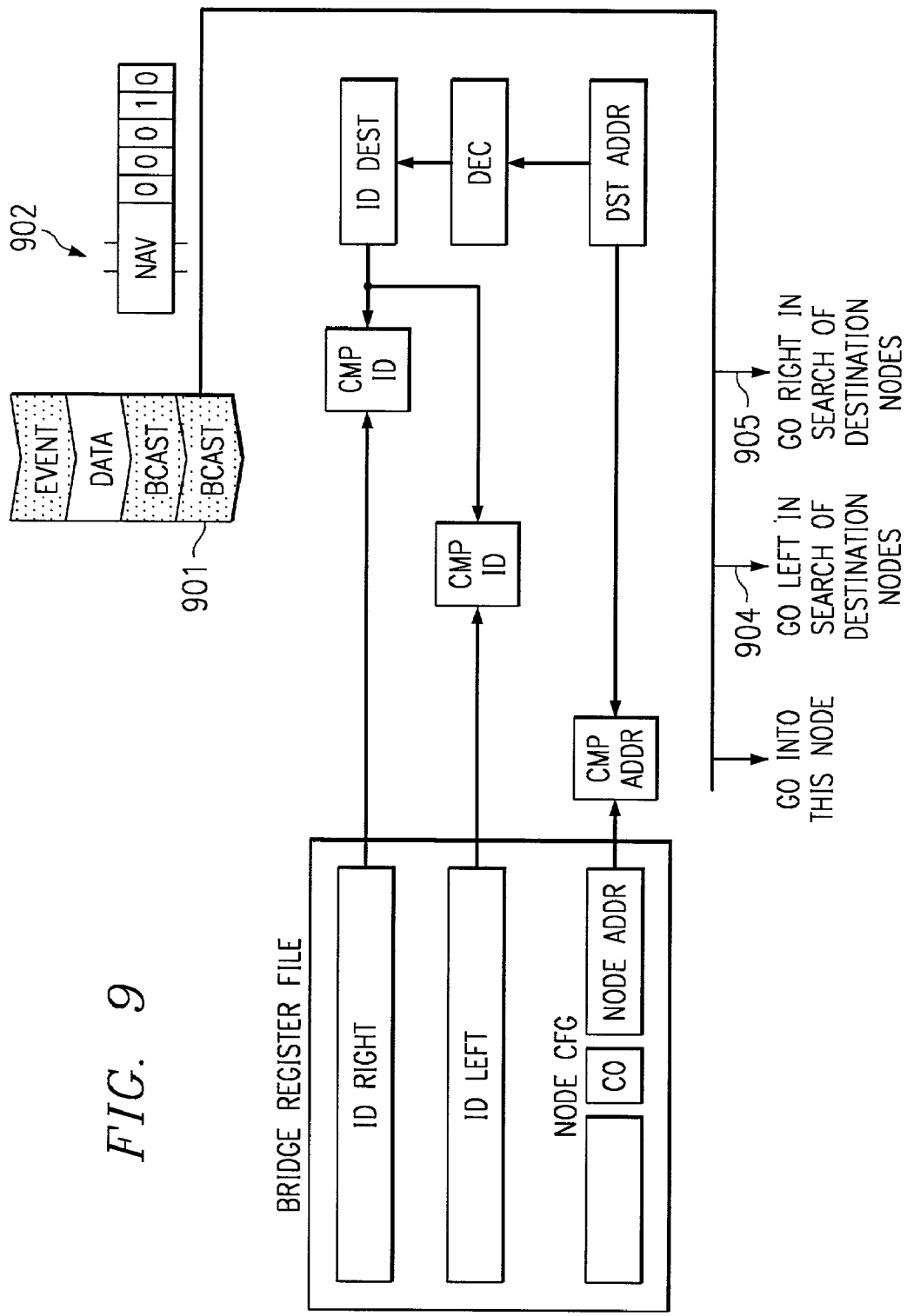
FIG. 9 illustrates broadcast packet routing protocol.

FIG. 9 illustrates broadcast packet routing protocol. A broadcast packet is identified by a BCAST rx_opcode 901 in its header. As the header enters the bridge component at a local node, the 3-bit NAV field 902 inside the BCAST rx_opcode is evaluated to determine the port(s) through which the packet is going to leave the bridge. A value of logical 1 in the middle NAV bit causes the packet to enter this local node through the internal center port of the bridge, across the receiver and into the active channel block of the local I/O RAM. A value of logical 1 in the left bit of NAV field 902 causes the packet to be routed out of the bridge through the left port 904 another node on the network. Similarly, a logical 1 in the right bit of NAV field 902 causes the packet to be routed out of the bridge through the right port 905 another node on the network. Any combination of bits can be turned on inside NAV field 902, making it possible for the same data packet to both enter the node and be also routed out of the bridge through either left, right or both ports. Each BCAST rx_opcode is only used once per each intermediate node. After entering each node, the spent BCAST rx_opcodes are popped off the packet header and BCAST rx_opcode immediately behind it is used to navigate the packet through the next link on the datapipe network. As shown int FIG. 9, the other bridge hardware is not used for broadcast packets.

Figure 10:
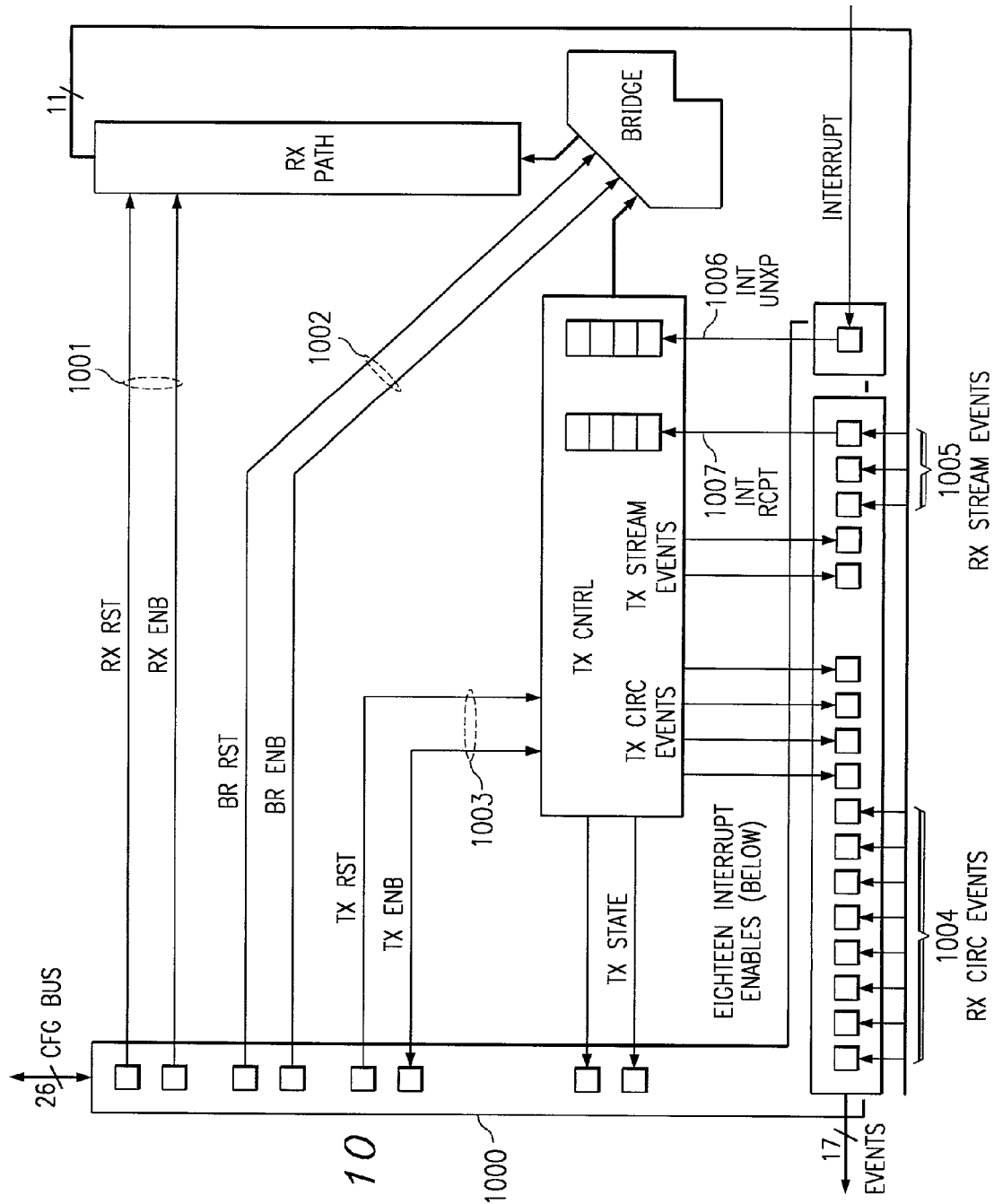
FIG. 10 illustrates datapipe events, interrupts and configuration bits.

FIG. 10 illustrates datapipe events, interrupts and configuration bits. Configuration of the datapipe is accomplished through a 26-bit CFG_BUS, which includes six inputs of reset and enable functions routed to the receiver, bridge, and transmitter, respectively. These are labeled 1001, 1002, and 1003 in FIG. 10. A total of twenty-one monitor signals are routed back into the CFG_BUS 1000 I/O. These twenty one signals are: (a) two inputs from the transmitter labeled TX_STATE; and (b) seventeen event signals including TX_CIRC events (4), TX_STREAM events (2), RX_CIRC events (8), RX_STREAM events (3) and (c) two interrupt signals INT UNEXP 1006 and INT RCPT 1007. The two interrupt signals INT UNXP 1006 and INT RCPT 1007 are also monitored.

The above illustrates the controllability aspects of the datapipe. The registers on FIG. 10 contain enough event bits and control bits for the digital signal processor to take full advantage of all datapipe features with minimum latency. In addition to controllability, the datapipe also includes programmable flexibility to drive packets out of or into nodes. Other capability built into the bridge allows it to autonomously navigate through the sea of digital signal processors. This can be characterized as two levels of programmable configurability.

Level 1: The transmitter is programmed with tx_opcodes to actively drive the communication grid with a predefined approach repeated during each processing frame or to drive the grid via unexpected packets much like a microprocessor is programmed to process data. Also the receiver may be programmed with rx_opcodes to actively receive packets into designated buffers, turn them around back to the source or pull other data from the destination node back to the source node. Datapipe mastering of transmission and reception operations is different from conventional methods where the CPU and DMA drive the data in and out and the communication peripheral is just a slave responding to their actions.

Level 2: In addition to controlling the receiver, some of the rx_opcodes embedded in each packet actively PROGRAM each bridge they encounter to configure it for that packet. The programmable bridge element of the datapipe is programmed by each packet (rx_opcodes) to take different actions in response to matching of the routing information contained in the packet and bridge. This is different from conventional methods where the routing bridges are hardwired and not subject to programmable reconfigurability by the packet to route the packet in different ways depending on what type of the packet is being processed. These configuration control and monitor signals enable the effective configuration of a datapipe through the use of normal tx_opcode operations. Access to the transmitter, bridge, and receiver control registers through the tx_opcodes provides for the completion of the configuration process.

FIG. 10 illustrates datapipe events, interrupts and configuration bits concerned with datapipe configuration. The datapipe configuration/status register 1000 contains separate reset and enable control/status bits for each of the three datapipe components, receiver, bridge and transmitter. Each of the three modules can be independently reset and can also be independently disabled and enabled 1001, 1002, 1003 without loss of data. All configuration/status register bits are typically written to and read by the CPU. However the TX_ENB bit can be unasserted by the transmitter after executing the HALT tx_opcode. The two TX_STATE bits are always set by the transmitter, and reflect the current state of the transmitter. A value of 11 binary represents the transmitter traversing the batch script, 01 binary represents the transmitter traversing the unexpected transfer script and 10 binary represents the transmitter traversing the receipt confirmation script.

The internal datapipe interrupt flag register delivers seventeen datapipe events to the chip interrupt selectors and receives two interrupts driving the datapipe transmitter and one interrupt driving the bridge. The INT_UNXP 1006 interrupt, if enabled, causes the transmitter to temporarily suspend batch transfers and to start processing the unexpected transfer script. The INT_RCPT 1007 interrupt, if enabled, causes the transmitter to temporarily suspend batch transfer and to start processing the transfer receipt script. The eleven datapipe events are composed of eleven events from the receiver (eight circular events 1004 and three stream events 1005) and six transmitter events (four circular events and two stream events). All seventeen datapipe interrupt flags are mirrored by corresponding interrupt enable bits in the datapipe interrupt enable register. The seventeen datapipe interrupt flag have a persistence of one clock pulse period.

Figure 11:
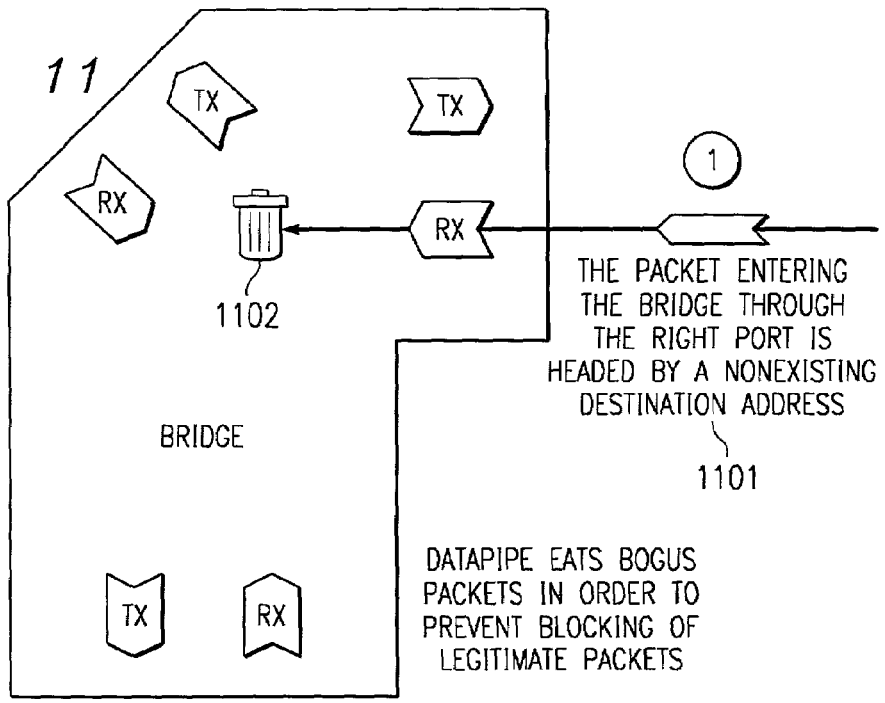
FIG. 11 illustrates the datapipe bridge consuming bogus packets.

FIG. 11 illustrates the datapipe bridge consuming bogus packets. The probability of system component failure increases as more complex digital signal processors are connected together. This is especially true in massively parallel systems, where there is a real probability that a single digital signal processor may become incapacitated by software, hardware or mechanical failure. The inter-processor communications infrastructure should treat isolated component failures as real operating conditions. The datapipe hardware is designed to pro-actively seek out system component failures as soon as they happen, and to remedy them before they bring down the system.

All transfer packets are routed through the bridge component of all intermediate nodes on the way from the source node to the destination node. The routing action means that, at each node stop, the packet enters the bridge through one of three ports (left, center or right) and then is automatically routed out of the bridge though the same or a different port. The routing path inside the bridge largely depends on the comparison of the destination address, leading the packet inside its header, with the 5-bit local bridge node address and the left and right 32-bit ID registers. A successful destination address match with the local node address usually results in the packet being absorbed into that node across the bridge center port. A successful destination address match with any of the two ID registers, representing direction to other nodes in the system, results in the packet being routed back out of the node through the left or right bridge ports.

As illustrated in FIG. 11, a potential software error could encode a non-existing destination address 1101 in the header of the packet. The bridge of each node, upon encountering a packet whose destination does not match either the local node address or left/right direction IDs, will be consumed 1102 by the first bridge that it encounters. This is necessary in order to prevent an aimless packet from backing up the datapipe routing FIFOs and preventing other legitimate packets from getting through to their destinations. It also prevents the aimless packet from wondering around the datapipe network and tying up the bandwidth without any benefit.

Figure 12:
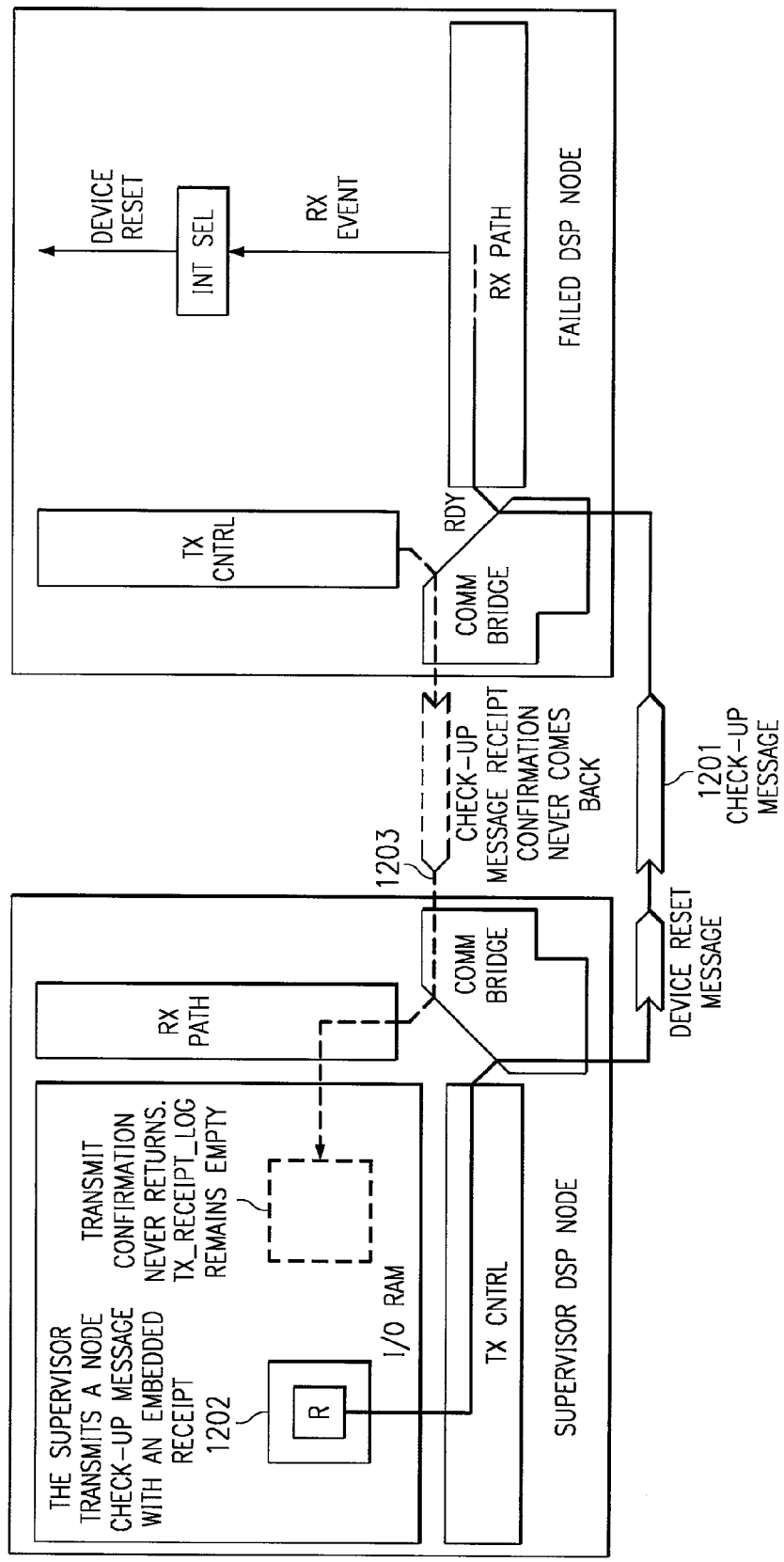
FIG. 12 illustrates the recovery from a node failure.

FIG. 12 illustrates the recovery from a node failure. Some massively parallel systems may experience a catastrophic failure of one of its digital signal processor nodes. The node failures may be caused by software, hardware or system operation being subjected to conditions not allowed by the specifications. The communications infrastructure must be tolerant of multiple node failures in order to be robust and practical. The datapipe pro-actively deals with node failures in three steps.

1. When one node fails, it must not block the communications channels connecting the surviving nodes (or to cause them to back up with data), even if the surviving nodes are continuing to send data to the failed node.

2. The surviving nodes must be able to detect when and which other nodes are failing.

3. Finally, a surviving node has to be able to either disconnect the failed nodes from the network, or to re-boot them and bring them back into the network.

Catastrophic node failure detection is implemented by a chosen "supervisory" node making periodic "health" check-ups 1201 on all other nodes in the system. The supervisor performs check-ups on other nodes by sending them messages 1202 with embedded transfer confirmation receipts 1203. A check-up confirmation receipt could contain a pointer to a specific table in the I/O RAM of the patient containing current node health parameters. An ailing node could be identified by non-nominal health parameters in the check-up confirmation receipt. A dead node could even fail to bounce any receipt 1203 back to the supervisor node. In both cases the supervisor node is alerted if things are not well with one or more nodes in the system. Two or four supervisory nodes could share the failure detection task to prevent any one failed supervisor from bringing down the system.

Inside the failed node, one of the digital signal processor timers has been set up to send a time-out event to the local datapipe if the CPU fails to periodically restart the counter before it reaches zero. A failed CPU, by virtue of its inaction, will allow the timer to count out and the generated TIME_OUT timer interrupt reaches the datapipe. If enabled by the TO_ENB bit inside the datapipe configuration/status register, the timer event causes the local receiver to unconditionally open up and consume all data that is being send to this node by other nodes that still do not have the information that the destination is either ailing or dead.

After the supervisor becomes informed about a node failure, and the node itself has been taken out of the grid and is no longer a threat to other nodes, the supervisor may now attempt a recovery. The first step would be to reset the failed node. This is done by the supervisor sending a short EVENT packet with an embedded EVENT rx_opcode.

If the bridge in the patient node is broken along with the rest of the digital signal processor, the node can be written off. The system must rewrite the routing data in the direction registers ID_RIGHT 812 and ID_LEFT 813 of adjacent nodes. This will prevent data being sent to the failed node and route data destined for other nodes around the failed node. However, if the bridge in the patient node is still working, the EVENT rx_opcode makes it all the way to the receiver in the patient node and causes a reset rx_event to be sent to the CPU interrupt selector. Assuming that the reset rx_event has been previously set-up inside the interrupt selector to drive the internal reset signal, the node resets and is ready for a standard datapipe boot by the supervisor or another node on the network, thus bringing the failed node back into the datapipe grid.

What is claimed is:

1. A method of data processing comprising:
    connecting a plurality of data processing nodes in a peer-to-peer relationship, thereby enabling each data processing node to receive data packets from adjacent input connected nodes and to transmit data packets to adjacent output connected nodes;
    at each data processing node examining data packets received from adjacent input connected nodes and selectively routing the received data packet to the current data processing node, routing to an adjacent output connected node or both, whereby any data processing node can transmit a data packet to any destination data processing node for forwarding by other data processing nodes to the destination data processing node;
    at each data processing node responding to a receipt confirmation data packet received from a source data processing node by transmitting an acknowledge data packet to the source data processing node transmitting that receipt confirmation data packet; and
    at least one supervisory data processing node periodically transmitting a receipt acknowledge data packet to each other data processing node and determining a data processing node has failed upon failure to receive an acknowledge data packet from the data processing node in response to a receipt confirmation data packet.

2. The method of data processing of claim 1, further comprising the steps of:
    storing health data at each data processing node concerning the current health operating status of that data processing node; and
    wherein said step of responding to a receipt confirmation data packet includes transmitting an acknowledge data packet including the stored health data.

3. The method of data processing of claim 1, further comprising:
    at each data processing node storing a unique node ID;

at each data processing node storing an indication of node IDs corresponding to each adjacent output connected node;

said step of selectively routing the data packet includes
routing the received data packet to the current data processing node if a header of the data packet includes the node ID of the data processing node, routing the received data packet to an adjacent output connected node if the header of the data packet includes a node ID matching the corresponding stored indication of node IDs for the adjacent output connected node, and not routing the received data packet to the current data processing node or to any adjacent output connected node if the header of the data packet includes a node ID not watching the node ID of the data processing node or the stored indication of node IDs for any adjacent output connected node.

4. The method of data processing of claim 1, wherein each data processing node includes a CPU core and a bridge circuit connected to the Cpu core, the adjacent input connected nodes and the adjacent output connected nodes, said method further comprising the steps of:

at each data processing node employing a program running on the CPU core to periodically reset a timer in the bridge circuit and using the bridge circuit to not route any received data packet to the current data processing node or to any adjacent output connected node upon expiration of a time of the timer, whereby a data processing node having a failed Cpu core absorbs all received data packets.

5. A method of data processing comprising:

connecting a plurality of data processing nodes in a peer-to-peer relationship, thereby enabling each data processing node to receive data packets from adjacent input connected nodes via input ports and to transmit data packets to adjacent output connected nodes via output ports;

at each data processing node storing a unique node ID;

at each data processing node storing f or each output port an indication of a set of node IDs to be reached via that output port;

at each data processing node examining data packets received from adjacent input connected nodes and selectively routing the data packet including routing the received data packet to the current data processing node if a header of the received data packet includes the node ID of the data processing node, routing the received data packet to an output port if the header of the received data packet includes a node ID within the corresponding stored indication of node IDs for that output port;

at each data processing node responding to a receipt confirmation data packet received from a source data processing node by transmitting an acknowledge data packet to the source data processing node transmitting the receipt confirmation data packet; and at least one supervisory data processing node periodically transmitting a receipt acknowledge data packet to each other data processing node and determining a data processing node has failed upon failure to receive an acknowledge data packet from the data processing node in response to a receipt confirmation data packet.

6. The method of data processing of claim 5, further comprising the steps of:

storing health data at each data processing node concerning that current health operating status of the data processing node; and wherein said step of responding to a receipt confirmation data packet includes transmitting an acknowledge data packet including the stored health data.

7. The method of data processing of claim 5, further comprising:

said step of selectively routing the data packet includes not routing the received data packet to the current data processing node or to any output port if the header of the data packet includes a node ID not matching the node ID of the data processing node or the stored indication of node IDs for any output port.

8. The method of data processing of claim 5, wherein each data processing node includes a CPU core and a bridge circuit connected to the CPU core, the adjacent input connected nodes and the adjacent output connected nodes, said method further comprising the steps of:

at each data processing node employing a program running on the CPU core to periodically reset a timer in the bridge circuit and using the bridge circuit to not route any received data packet to the current data processing node or to any adjacent output connected node upon expiration of a time of the timer, whereby a data processing node having a failed CPU core absorbs all received data packets.

* * * * *